United States Patent
Okisu et al.

(10) Patent No.: US 6,940,555 B2
(45) Date of Patent: Sep. 6, 2005

(54) IMAGE TAKING APPARATUS HAVING FOCUS CONTROL

(75) Inventors: Noriyuki Okisu, Osaka (JP); Yuji Taguchi, Osaka (JP); Yasuhiro Morimoto, Osaka (JP); Shinichi Fujii, Osaka (JP)

(73) Assignee: Minolta Co., Ltd., Osaka (JP)

( * ) Notice: Subject to any disclaimer, the term of this patent is extended or adjusted under 35 U.S.C. 154(b) by 762 days.

(21) Appl. No.: 09/859,703

(22) Filed: May 17, 2001

(65) Prior Publication Data

US 2001/0045982 A1 Nov. 29, 2001

(30) Foreign Application Priority Data

May 19, 2000 (JP) .................................. 2000-148551
May 19, 2000 (JP) .................................. 2000-148554

(51) Int. Cl.$^7$ .............................................. H04N 5/232
(52) U.S. Cl. ....................... 348/345; 348/348; 348/349; 348/36; 348/240.99
(58) Field of Search ............................ 348/345, 348, 348/349, 354, 355, 143, 36, 39, 218.1, 239, 222.1, 240.99, 240.1, 240.2

(56) References Cited

U.S. PATENT DOCUMENTS 5,124,842 A    6/1992  Honda et al.
5,172,236 A  * 12/1992  Takemoto et al. .......... 348/355
6,320,979 B1 * 11/2001  Melen ......................... 382/154

FOREIGN PATENT DOCUMENTS

| JP | 09-200508 A | 7/1997 | |
| JP | 10-108057 A | 4/1998 | |
| JP | 10108057    | * 4/1998 | .......... H04N/5/232 |

OTHER PUBLICATIONS

"Registration of multi–focus images covering rotaiton and first reconstruction of arbitrarily focused image by using filters" written by Akira Kubota and Kiyoharu Aizaea, Technical Report of IEICE, IE99–25 (Jul. 1999), pp. 1–8, with partial English translation, pp. 1–8.

* cited by examiner

*Primary Examiner*—Tuan Ho
*Assistant Examiner*—Gevell Selby
(74) *Attorney, Agent, or Firm*—Sidley Austin Brown & Wood LLP

(57) ABSTRACT

An image taking apparatus includes an image sensor which takes a plurality of images different in focal distance, a processor which creates a pan-focus image focused on each of different photographic objects from the plurality of images taken by the image sensor, a discriminator which discriminates whether or not it is appropriate to create the pan-focus image, and a controller which forbids the processor to create the pan-focus image when the discriminator discriminates that it is not appropriate to create the pan-focus image.

6 Claims, 16 Drawing Sheets

IMAGE TAKING APPARATUS HAVING FOCUS CONTROL

This application claims priority to Japanese Patent Application Nos. 2000-148551 and 2000-148554 each filed on May 19, 2000, the disclosure of which is incorporated by reference in its entirety.

BACKGROUND OF THE INVENTION

1. Field of the Invention The present invention relates to an image taking apparatus such as a digital camera, an image processing apparatus, an image processing method and a recording medium.

2. Description of Related Art Some of digital cameras are designed to take images in a pan-focus image mode. In this pan-focus image mode, a pan-focus image, i.e., an image focused on each of different photographic objects, can be formed from a plurality of images different in focal distance, such as a foreground image and a background image.

By the way, in creating a pan-focus image, as shown in FIG. 16A, when the third photographic object R whose image will be out of focus exists between the foreground and background photographic objects P and Q whose images are to be taken by a digital camera 200, only the photographic object R will be unfocused, causing an unnatural image as a whole. As a result, an appropriate pan-focus image cannot be obtained. Furthermore, in cases where the depth of field 30 is deep, when the foreground photographic object P and the background photographic object Q are located within this depth of field 30 as shown in FIG. 16B, both the objects will be nearly focused. Thus, in this case, there is no necessity to create a pan-focus image. In the aforementioned cases, composite processing for creating a pan-focus image will become wasteful.

On the other hand, another digital cameras are equipped with a blur-control processing mode. In this blur-control processing mode, from a plurality of images focused on, for example, each of the foreground and the background different in focal distance, an image whose foreground image or background image is controlled in blur degree can be obtained. In the aforementioned blur-control processing, in cases where photographic objects P and Q whose images are to be taken by the digital camera 200 are located too close as shown in FIG. 17A, since the foreground and the background cannot be distinguished, it is difficult to perform the blur-control processing. Furthermore, in macro image taking shown in FIG. 17B, when the foreground focused image and the background focused image is greatly different in Image taking magnification, both the blur degree of the background Q in the foreground focused image and that of the foreground P in the background focused image will become large. In such a case, when blur-control processing is performed, an image whose foreground P and background Q are not distinguished clearly at the boundary thereof will be obtained. Even if blur-control processing is performed on these conditions, a wasteful image will be obtained.

Japanese Patent Unexamined Laid-open Publication No. 10-108057 discloses a constitution which takes a plurality of images to perform an image composition. In the aforementioned constitution, a pan-focus image will be created by taking a plurality of images focused on all photographic objects located within the predetermined range specified by photographic object distance information and then composing these images. On the other hand, when the range of distance measurement data is smaller than the depth of field, only one image will be taken.

However, with this constitution, even if all of the photographic objects are located within the depth of field, at least one image will be taken. Accordingly, the image processing and/or the image taking becomes wasteful.

SUMMARY OF THE INVENTION

It is an object of the present invention to provide an image taking apparatus which can avoid wasteful image processing and/or wasteful image taking when creating a pan-focus image.

It is another object of the present invention to provide an image processing apparatus which can avoid wasteful image processing when creating a pan-focus image.

It is still another object of the present invention to provide an image processing method which can avoid wasteful image processing when making a pan-focus image.

It is still yet another object of the present invention to provide a recording medium storing a program by which a computer is controlled so as not to perform wasteful image processing when performing pan-focus image processing.

It is still yet another object of the present invention to provide an image taking apparatus which can avoid wasteful image processing and/or wasteful image taking when creating a blur-controlled image.

It is still yet another object of the present invention to provide an image processing apparatus which can avoid wasteful image processing when creating a blur-controlled image.

It is still yet another object of the present invention to provide an image processing method which can avoid wasteful image processing when creating a blur-controlled image.

It is still yet another object of the present invention to provide a recording medium storing a program by which a computer is controlled so as not to perform wasteful image processing when creating a blur-controlled image.

According to the first aspect of the present invention, an image taking apparatus includes an image sensor which takes a plurality of images different in focal distance, a processor which creates a pan-focus image focused on each of different photographic objects from the plurality of images taken by the image sensor; a discriminator which discriminates whether or not it is appropriate to create the pan-focus image; and a controller which forbids the processor to create the pan-focus image when the discriminator discriminates that it is not appropriate to create the pan-focus image.

With this image taking apparatus, when a plurality of images different in focal distance are taken by the image sensor, a pan-focus image focused on each photographic objects will be created by the processor. However, before the creation of the pan-focus image, the discriminator discriminates whether or not it is appropriate to create the pan-focus image. When it is discriminated to be inappropriate, the creation of the pan-focus image by the processor will not be performed. Therefore, it becomes possible to avoid wasteful processing for creating a pan-focus image.

According to the second aspect of the present invention, an image taking apparatus includes: an image sensor which takes a plurality of images different in focal distance; a processor which creates a pan-focus image focused on each of different photographic objects from the plurality of images taken by the image sensor; a discriminator which discriminates whether or not it is appropriate to create the pan-focus image: and a controller which forbids the image sensor to take images when the discriminator discriminates that it is not appropriate to create the pan-focus image.

With this image taking apparatus, although a pan-focus image focused on each photographic object will be created by the processor from a plurality of images different in focal distance taken by the image sensor, before creating the pan-focus image, the discriminator discriminates whether or not it is appropriate to create the pan-focus image. When discriminated to be inappropriate, since the image taking by the image sensor will not be performed, wasteful image taking can be avoided.

According to the third aspect of the present invention, an image processing apparatus includes: a processor which creates a pan-focus image focused on each of different photographic objects from a plurality of images different in focal distance; a discriminator which discriminates whether or not it is appropriate to create the pan-focus image; and a controller which forbids the processor to create the pan-focus image when the discriminator discriminates that it is not appropriate to create the pan-focus image.

With this image forming apparatus, although a pan-focus image focused on each of different photographic objects will be created from a plurality of images different in focal distance by the processor, before creating the pan-focus image, it is discriminated by the discriminator whether or not it is appropriate to create the pan-focus image. When discriminated to be inappropriate, the processing for creating the pan-focus image by the processor will not be performed. Therefore, it becomes possible to avoid wasteful processing for creating the pan-focus image.

According to the fourth aspect of the present invention, an image processing method includes: reading out a plurality of images different in focal distance; discriminating whether or not it is appropriate to create a pan-focus image focused on each of different photographic objects; creating the pan-focus image when it is discriminated that it is appropriate to create the pan-focus image; and forbidding creating the pan-focus image when it is discriminated that it is not appropriate to create the pan-focus image.

In this image processing method, It is also discriminated whether or not it is appropriate to create a pan-focus image. When discriminated to be inappropriate, the processing for creating the pan-focus image will not be performed.

According to the fifth aspect of the present invention, a recording medium storing a program by which a computer executes the following controls: reading out a plurality of images different in focal distance; discriminating whether or not it is appropriate to create a pan-focus image focused on each of different photographic objects: creating the pan-focus image when it is discriminated that it is appropriate to create the pan-focus image; and forbidding creating the pan-focus image when it is discriminated that it is not appropriate to create the pan-focus image.

By this recording medium, the computer is controlled so as to discriminate whether or not it is appropriate to create a pan-focus image, and so as not to perform the processing for creating the pan-focus image when discriminated to be inappropriate.

According to the sixth aspect of the present invention, an image taking apparatus includes: an image sensor which takes a plurality of images different in focal distance; a processor which creates a blur-controlled image of a photographic object from a plurality of images taken by the image sensor; a discriminator which discriminates whether or not it is appropriate to create the blur-controlled image; and a controller which forbids the processor to create the blur-controlled image when the discriminator discriminates that it is not appropriate to create the blur-controlled image.

With this image taking apparatus, after taking a plurality of images different in focal distance by the sensor, a blur-controlled image will be created from the plurality of images by the processor. However, before the creation, it is discriminated by the discriminator whether or not it is appropriate to create the blur-controlled image. When discriminated to be inappropriate, the processing for creating the blur-controlled image will not be performed. Therefore, it becomes possible to avoid wasteful image creation processing.

According to the seventh aspect of the present invention, an image taking apparatus includes: an image sensor which takes a plurality of images different in focal distance; a processor which creates a blur-controlled image of a photographic object from the plurality of images taken by the image sensor; a discriminator which discriminates whether or not it is appropriate to create the blur-controlled image: and a controller which forbids the image sensor to take images when it is discriminated by the discriminator that it is not appropriate to create the blur-controlled image.

With this image taking apparatus, after taking a plurality of images different in focal distance, a blur-controlled image will be created by the processor from these images. However, before the creation, it is discriminated by the discriminator whether or not it is appropriate to create the blur-controlled image. When discriminated to be inappropriate, the image taking by the image sensor will not be performed. Therefore, it becomes possible to avoid wasteful image taking.

According to the eighth aspect of the present invention, an image processing apparatus includes: a processor which creates a blur-controlled image of a photographic object from a plurality of images different in focal distance; a discriminator which discriminates whether or not it is appropriate to create the blur-controlled image; and a controller which forbids the processor to create the blur-controlled image when the discriminator discriminates that it is not appropriate to create the blur-controlled image.

With this image processing apparatus, a blur-controlled image of the photographic object will be created by the processor from a plurality of images different in focal distance. However, before the creation, it is discriminated by the discriminator whether or not it is appropriate to create the blur-controlled image. When discriminated to be inappropriate, the processing for creating the blur-controlled image by the processor will not be performed. Therefore, it becomes possible to avoid wasteful image creation processing.

According to the ninth aspect of the present invention, an image processing method includes: reading out a plurality of images different in focal distance; discriminating whether or not it is appropriate to create a blur-controlled image of a photographic object; creating a blur-controlled image when it is discriminated that it is appropriate to create the blur-controlled image; and forbidding creating the blur-controlled image when it is discriminated that it is not appropriate to create the blur-controlled image.

In this image processing method, it is also discriminated whether or not it is appropriate to create the blur-controlled image. When discriminated to be inappropriate, the processing for creating the image will not be performed.

According to the tenth aspect of the present invention, a recording medium storing a program by which a computer executes the following control: reading out a plurality of images different in focal distance; discriminating whether or not it is appropriate to create a blur-controlled image of a photographic object; creating the blur-controlled image when it is discriminated that it is appropriate to create the blur-controlled image; and forbidding creating the blur-controlled image when it is discriminated that it is not appropriate to create the blur-controlled image.

By this recording medium, the computer is controlled so as to discriminate whether or not it is appropriate to create the blur-controlled image, and so as not to perform the processing for creating the blur-controlled image when discriminated to be inappropriate.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS (Explanation of the First Embodiment)

Figure 1:
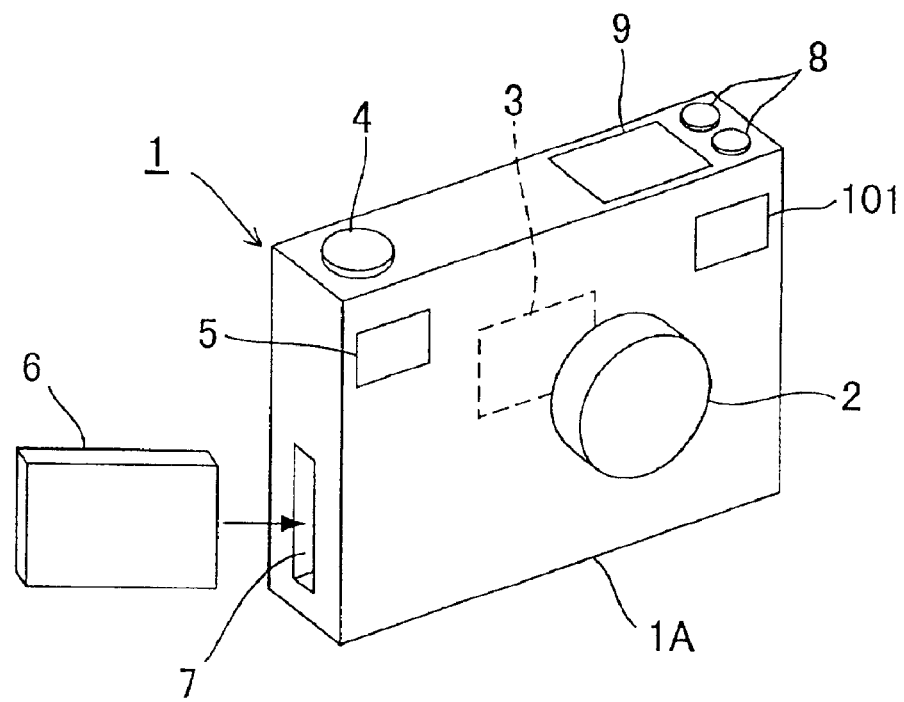
FIG. 1 is a perspective view showing a digital camera to which an image taking apparatus according to the first embodiment of the present invention is applied.
Figure 2:
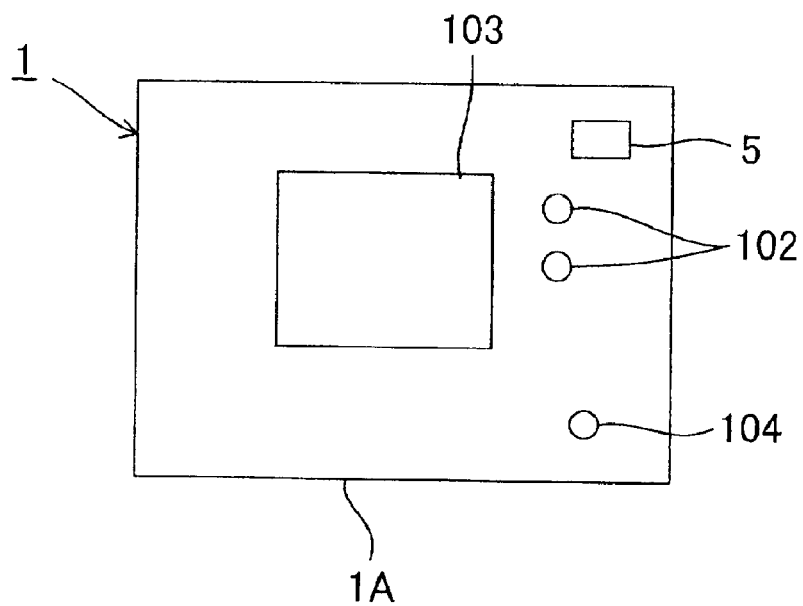
FIG. 2 is a rear view of the digital camera.

FIGS. 1 and 2 show the perspective view and the rear view of a digital camera to which an image taking apparatus according to the first embodiment of the present invention is applied, respectively.

In FIG. 1 and FIG. 2, the reference numeral 1 denotes a digital camera. On the front face of the camera main body 1A, an image taking lens 2, a finder window 5, a distance-measurement window 101, etc. are provided. In the camera main body 1A, a CCD 3 as an image pick-up element for photoelectrically converting the optical image is disposed on the optical path of the image taking lens 2. Furthermore, provided on the upper surface of the camera main body 1A are a shutter button 4, an image taking mode setting keys 8, a liquid crystal display panel 9, etc. The reference numeral 6 denotes a recording media 6 for recording image data, and the reference numeral 7 denotes a recording media insertion slit formed on the side surface of the camera main body 1A.

The image taking mode setting keys 8 are used for setting an exposure condition, such as an iris priority exposure and a shutter speed priority exposure, setting a macro image taking mode or setting a zoom condition while confirming via the liquid crystal display panel 9 by the user.

On the rear face of the camera main body 1A, image processing mode setting keys 102, an LCD monitor 103 as a view finder, an electronic warning buzzer 104, etc. are provided. By using the image processing mode setting keys 102, a user can set a pan-focus image creation mode, which will be mentioned later, while looking at the LCD monitor 103.

In this digital camera 1, the image data taken by the CCD 3 can be recorded in the recording media 6 like a conventional camera. In addition to this, it has a pan-focus image creation function. In this embodiment, although this function is activated when a pan-focus image creation mode is set by manipulating the image processing mode setting keys 102, the digital camera 1 may be designed so as to automatically activate the function without setting the mode manually.

Figure 3:
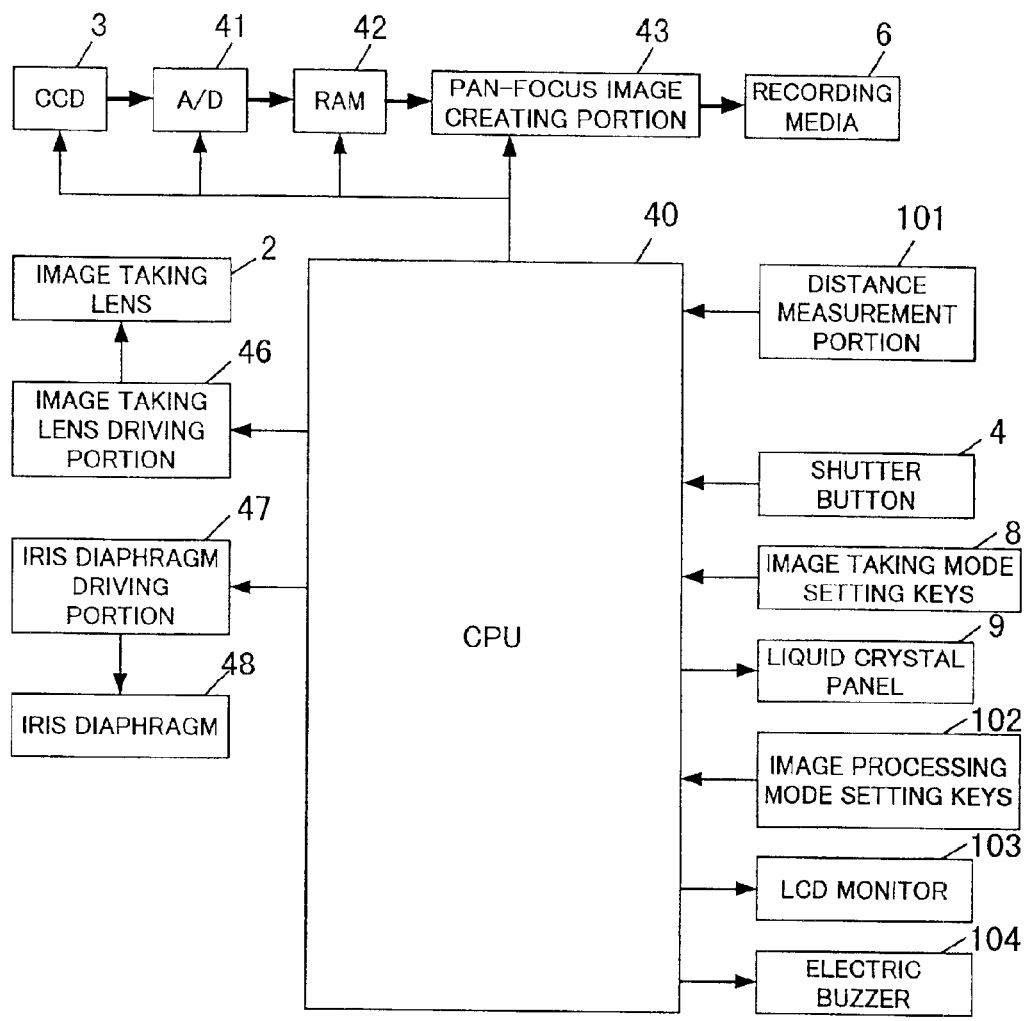
FIG. 3 is a block diagram showing the electric constitution of the digital camera.

FIG. 3 is a block diagram showing the electric constitution of the digital camera 1. In FIG. 3, the thin arrow shows the control data flow and the thick arrow shows the image data flow.

The reference numeral 40 denotes a CPU which stores the image taking conditions at the time of the shutter button 4 being pressed, the set status of the image processing mode setting keys 102, etc., and displays the exposure conditions, etc. on the liquid crystal display panel 9. Furthermore, the CPU 40 drives the image taking lens 2 so as to focus on a suitable photographic object via the image taking lens driving portion 46 based on the distance measurement result from the distance measurement portion 101, and also controls an iris diaphragm 48 via the iris diaphragm driving portion 47. The image taking lens 2, the iris diaphragm 48 and the CCD 3 constitute an image pick-up portion 20 (see FIG. 4).

Furthermore, the analog image signal from the CCD 3 is converted into digital image data by the A/D converter 41, and is stored temporarily in the image memory (RAM) 42. The CPU 40 makes the recording media 6 store the image data read from the RAM 42.

The pan-focus image creating portion 43 is constituted as a processor for creating an image focused on different photographic objects (a pan-focus image) by composing a plurality of images different in focal distance.

Figure 4:
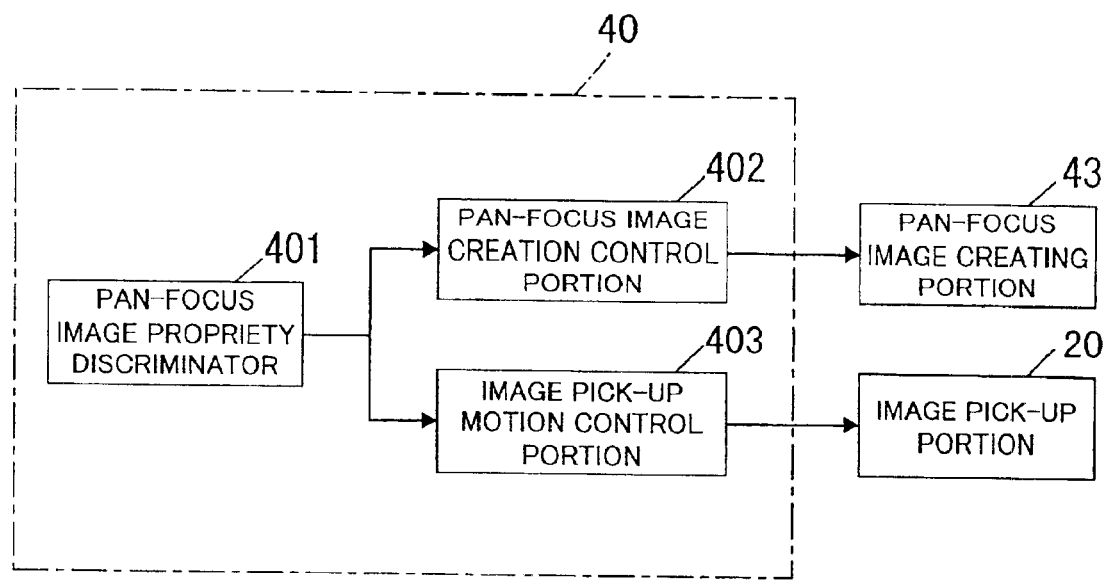
FIG. 4 is a block diagram showing the constitution of the principal part of the digital camera.

As shown in FIG. 4, functionally, the CPU 40 is equipped with a pan-focus image propriety discriminator 401 which discriminates whether or not it is appropriate to create a pan-focus image from a plurality of images, a pan-focus image creation control portion 402 which controls the image creation operation of the pan-focus image creating portion 43 according to the distinction result of the pan-focus image propriety discriminator 401, and an image pick-up motion control portion 403 which controls the image acquisition by the image pick-up portion 2 according to the distinction result. The pan-focus image creation control portion 402 and the image pick-up motion control portion 403 may be provided selectively.

Figure 16:
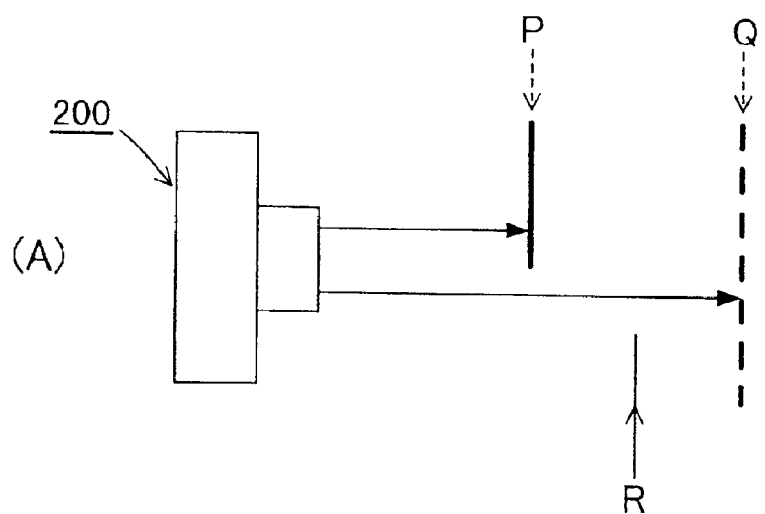
FIG. 16 is an explanatory view showing a scene which is inappropriate for creating a pan-focus image.
Figure 16:
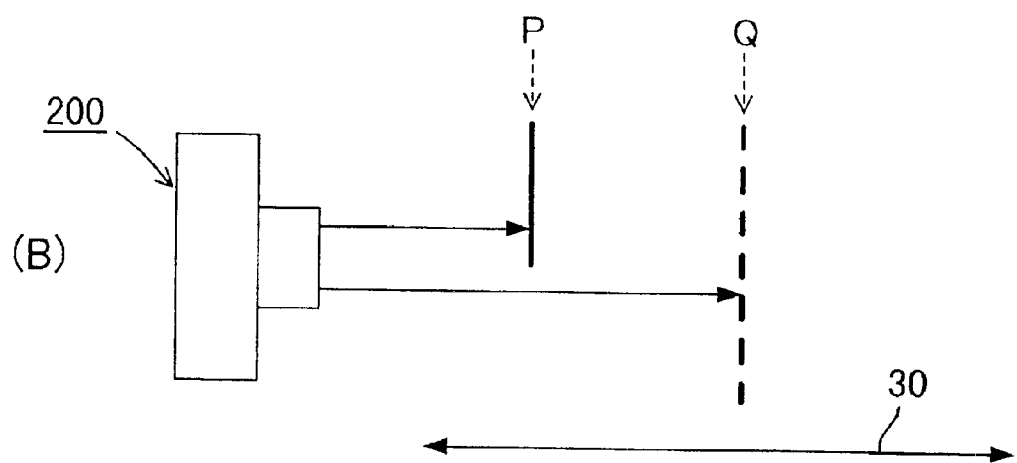

The pan-focus image propriety discriminator 401 has a function for detecting a scene which is inappropriate to create a pan-focus image, such as the scene in which the third photographic object which will be unfocused exists between the foreground object and background object as shown in FIG. 16A and the scene in which both the foreground object and background object exist within the depth of field as shown in FIG. 16B. To detect the aforementioned scene, the photographic object distance information measured by the distance-measurement portion 101 will be utilized. In this case, the measuring method may be a method which can measure a plurality of photographic objects, such as an active ranging method and a phase difference ranging method, etc. which are used by silver halide cameras.

Furthermore, concretely, the pan-focus image creation control portion 402 controls so as to stop the creation processing when discriminated that it is inappropriate to create a pan-focus image. If not inappropriate, it controls so as to create a pan-focus image. The image pick-up motion control section 403 is controlled so as to stop image acquisition when discriminated that it is inappropriate to create a pan-focus image. If not inappropriate, it controls so as to perform image acquisition. When creation processing of a pan-focus image and/or image acquisition are made to stop, the electronic warning buzzer 104 are made to sound and a warning message is displayed on the LCD monitor 103.

Next, an image composition in a pan-focus image creation mode will be explained.

Figure 5:
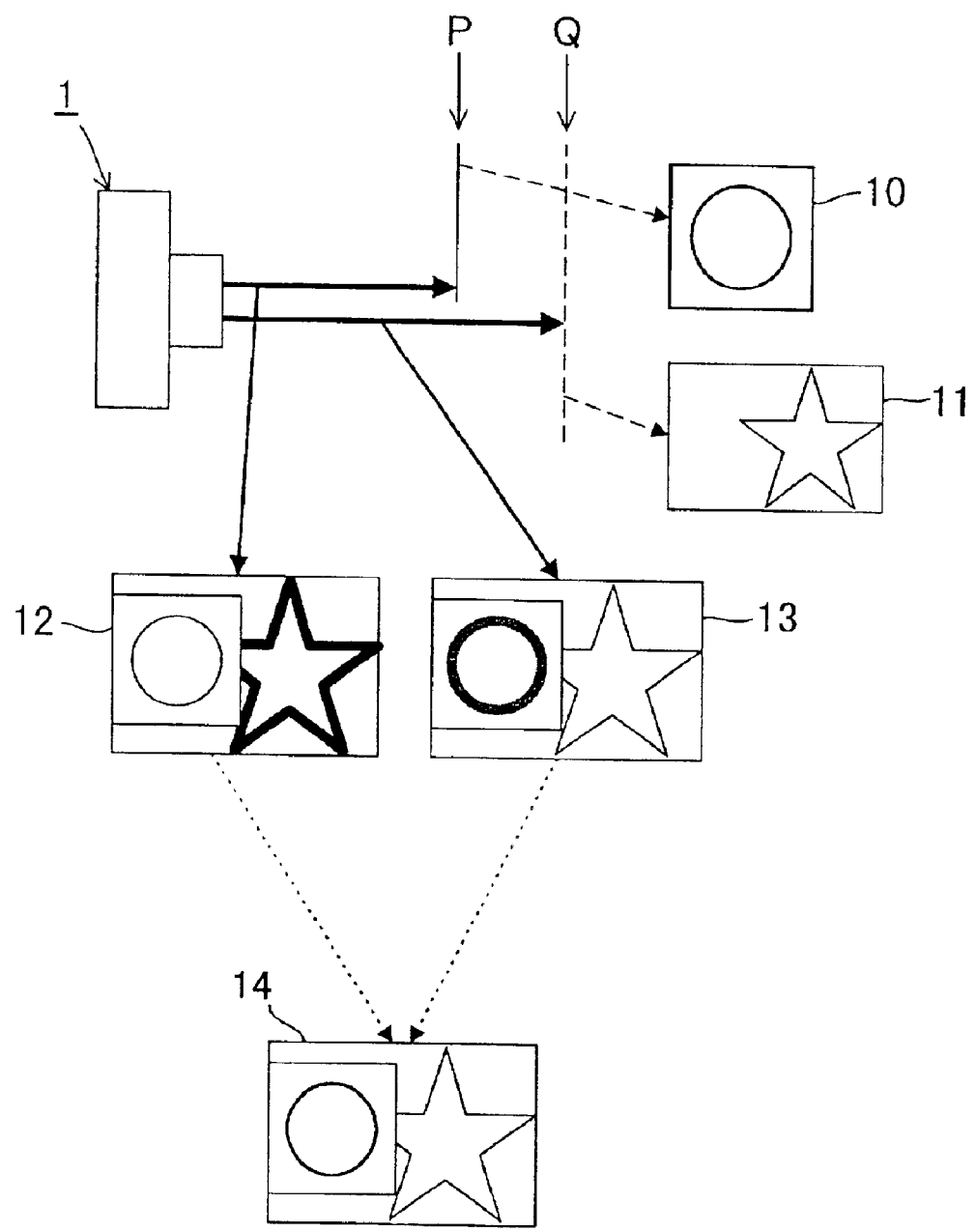
FIG. 5 is an explanatory view showing the processing for creating a pan-focus image.

FIG. 5 shows the so-called far-and-near-conflict scene in which photographic objects 10 and 11 exist on the P plane and the Q plane, respectively. In order to simplify the explanation, each of the photographic objects 10 and 11 is shown as a plane chart. The reference numeral 12 denotes an image focused on the P plane. In this image 12, the photographic object ○ of the chart 10 as a foreground is focused clearly and the photographic object ☆ of the chart 11 as a background is blurred(unfocused). On the other hand, the reference numeral 13 denotes an image focused on the Q Plane. In this image 13, the photographic object ○ of the chart 10 as a foreground is blurred (unfocused) and the photographic object ☆ of the chart 11 is focused.

In the pan-focus image mode, the pan-focus image 14 focused on both the photographic objects 10 and 11 will be created from these two images 12 and 13.

As mentioned above, the pan-focus image can be obtained from two images of the same scene taken by changing the focus side (focal position).

The principle of this pan-focus image creation is disclosed in U.S. Pat. No. 5,124,842 and Japanese Patent Unexamined Laid-open Publication No. 10-108057. Therefore, the explanation will be omitted here. Furthermore, a distance distribution of photographic objects is not limited to the aforementioned embodiment in which there are two objects, i.e., the foreground object and the background object. Although in the aforementioned embodiment two images are composed, for example, three, four or more images may be composed in cases where there are a foreground object, a background object and one or more objects located therebetween.

Figure 6:
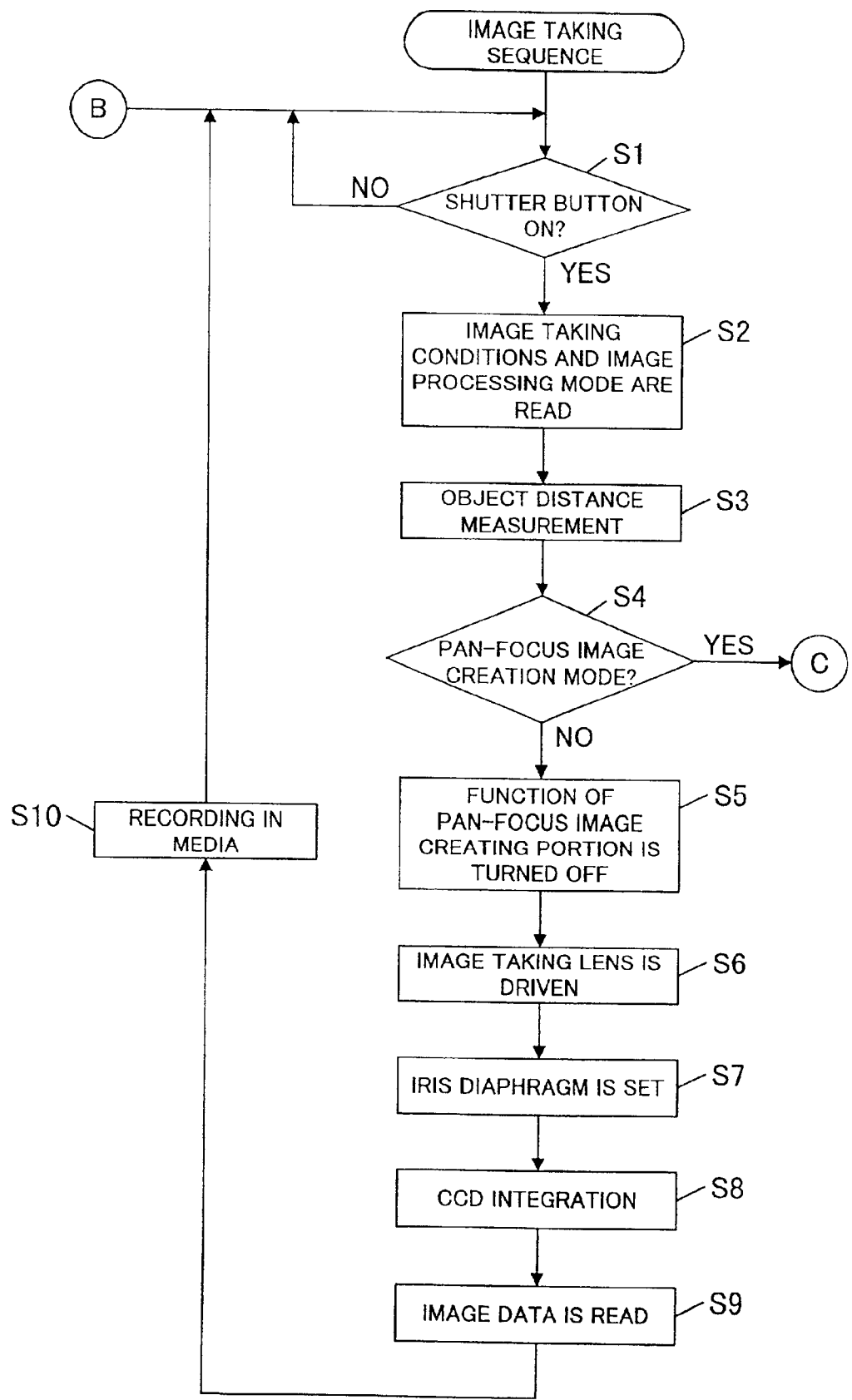
FIG. 6 is a flow chart showing the operation of the digital camera according to the first embodiment.

Next, the operation of the aforementioned digital camera will be explained with reference to the flow chart shown in FIGS. 6 and 7.

In the following explanation and drawings, a step will be abbreviated as "S."

When the shutter button 4 is pressed in S1, the CPU 40 reads and stores the set image processing mode and the image taking condition at that time in S2. Then, in S3, the photographic object distance is measured by the distance measurement portion 101.

Subsequently, in S4, it is judged whether or not the pan-focus image creation mode is set in the image processing mode. If the pan-focus image creation mode is set (YES in S4), the routine proceeds to S11 in FIG. 7. If the pan-focus image creation mode is not set (NO in S4), in S5, the function of the pan-focus image creating portion 43 is turned off (image data passes without being processed).

Then, in S6, based on the distance measurement result, the image taking lens 2 is driven so as to focus on a suitable photographic object via the image taking lens driving portion 46. Subsequently, in S7, the iris diaphragm is set to a suitable value via the iris diaphragm driving portion 47.

Then, the CCD 3 is integrated in S8, and the image data is read out in S9. The read image data is converted into digital data by the A/D converter 41 by the pipeline architecture, and is stored temporarily in the RAM 42. In S10, the CPU 40 reads out the image data of the RAM 42, and records the image data in the media 6. Then, the routine proceeds to S1 for the next image taking.

Figure 7:
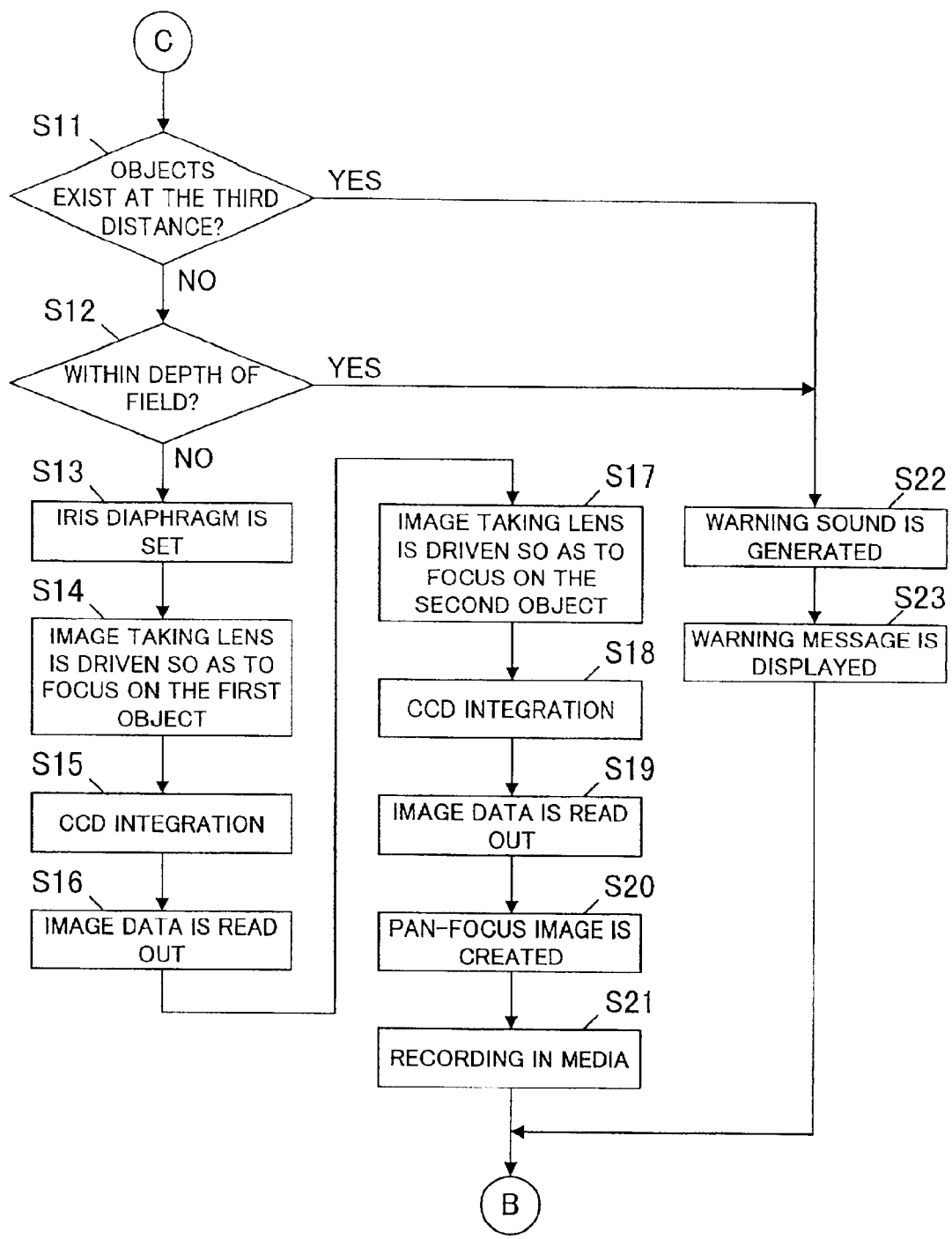
FIG. 7 is a flow chart showing the processing subsequent to the processing C in FIG. 6.

In S4, when the pan-focus image creation mode is set (YES in S4), it is judged whether or not a photographic object which will be out of focus exists in the third distance other than the foreground and the background from the distance measurement result in S11 of FIG. 7. Then, when an photographic object exists in the third distance (YES in S11), the routine proceeds to S22. When no photographic object exists in the third distance (No in S11), it is judged whether or not the photographic objects are located in the depth of field from the distance measurement data and the depth of field determined by the conditions of the image taking lens 2. When the photographic objects are located in the depth of field (YES in S12), the routine proceeds to S22.

In S22, since faults may occur when creating a pan-focus image, the CPU 40 makes the electronic warning buzzer 104 generate warning sound. At the same time, in S23, a warning message is displayed on the LCD monitor 103. Then, it is controlled by the image pick-up motion control portion 403 so as not to perform the image pick-up by the CCD 3, and the routine returns to S1.

In S12, when the photographic objects do not exist in the depth of field (No in S12), it is possible to create a pan-focus image. Therefore, in S13, the iris diaphragm will be set to a suitable value through the iris diaphragm driving portion 47. Then, in S14, the image taking lens 2 is driven through the image taking lens driving portion 46 so that the first photographic object is focused, and the CCD 3 is integrated in S15, and the image data is read out in S16. The read image data is converted into digital data by the A/D converter 41 by the pipeline architecture, and is stored temporarily in the RAM 42.

Next, in S17, the image taking lens 2 is driven through the image taking lens driving portion 46 so that the second photographic object is focused, and the CCD 3 is integrated in S18, and the image data is read out in S19. The read image data is converted into digital data by the A/D converter 41 by the pipeline architecture, and is stored temporarily in the RAM 42. Then, in S20, after the CPU 40 reads out each image data on the RAM 42 and the pan-focus image creating portion 43 creates a pan-focus image, the pan-focus image is recorded in the media 6 in S21, and the routine returns to S1.

By the way, in the pan-focus image creation mode, even if a pan-focus image is created by using two image, i.e., the foreground P focused image and the background Q focused image, when a third photographic object R which will be out of focus exists between the foreground photographic object P and the background object Q as shown in FIG. 16A, an unnatural image in which both the foreground P and the background Q are focused while the third photographic object R is out of focus will be obtained. This will also happen when the third photographic object R exists nearer than the foreground P or farther than the background Q.

Furthermore, as shown in FIG. 16B, in cases where the depth of field 30 shown by the arrow is deep and both the foreground P and the background Q exist within the depth of field 30, there is no necessity to create a pan-focus image.

Therefore, in cases where the situation equivalent to the two scenes shown in FIGS. 16A and 16B is detected, even if the pan-focus image creation mode is set, the pan-focus image will not be created. This can avoid wasteful creation of poor images. Furthermore, like this embodiment, the image taking itself may be stopped by the image pick-up motion control portion 403 when the aforementioned situation is detected before taking images. Alternatively, after the completion of image taking, the pan-focus image creation control portion 402 may control so as not to perform the creation processing of a pan-focus image.

(Explanation of a Second Embodiment)

Figure 8:
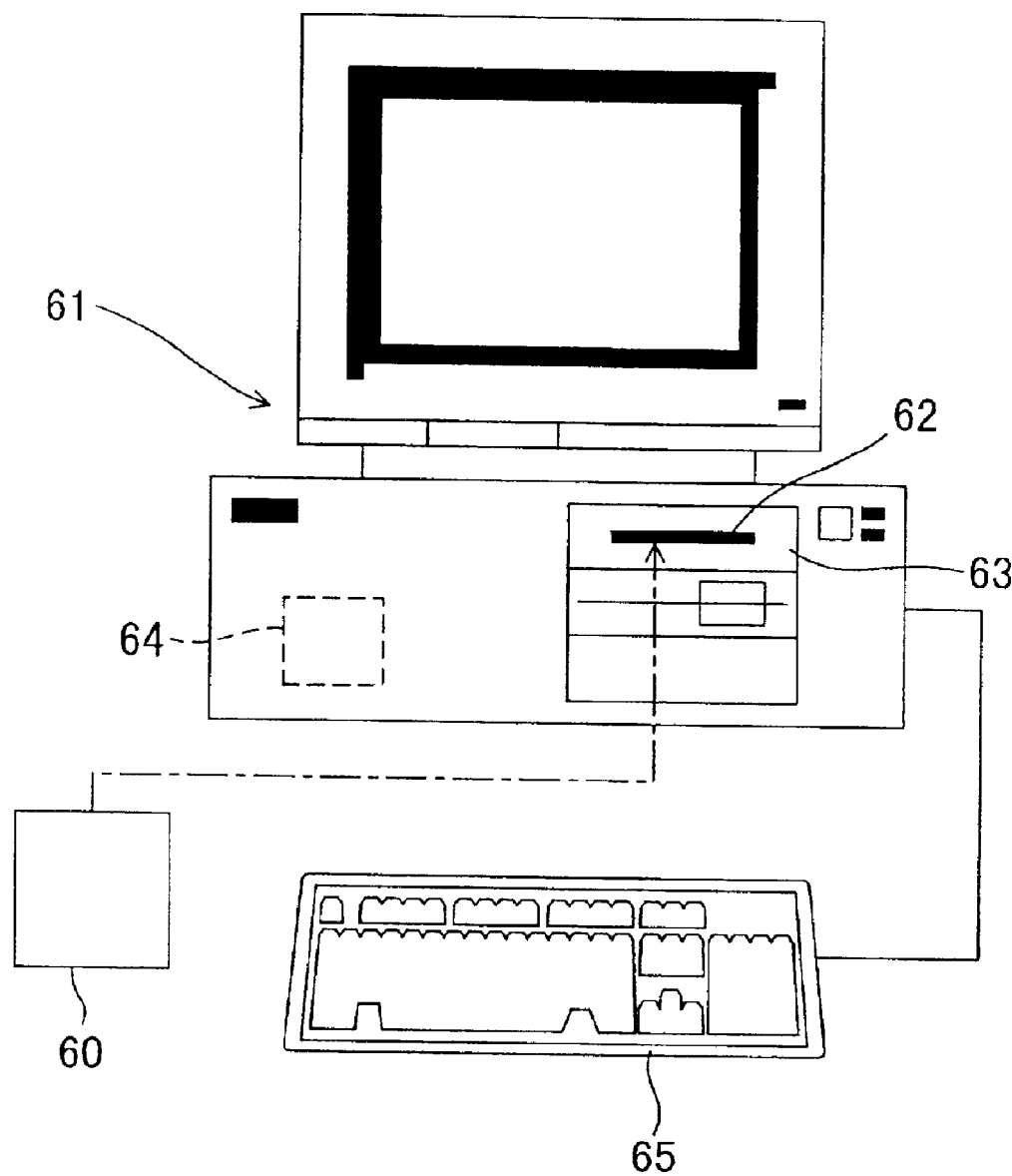
FIG. 8 is a block diagram showing an example of a computer as an image processing apparatus according to the second embodiment.

FIG. 8 is a block diagram showing a computer as an image processing apparatus performing pan-focus image creation processing. The computer has a pan-focus image creation function and a pan-focus image creation propriety distinction function.

The computer 61 as an image processing apparatus has a drive 63 with an insertion slit 62 into which a recording media 60 is inserted. The recording media 60 stores software required for pan-focus image creation processing and pan-focus image creation propriety distinction processing. The reference numeral 65 denotes a keyboard.

Furthermore, a plurality of image data (e.g., two image data) required for pan-focus image creation are obtained by a digital camera 1 and the like. The image data will be introduced directly from a digital camera 1 or via a portable recording medium (not shown), and stored in a storage of the computer 61, such as a hard disk.

Figure 9:
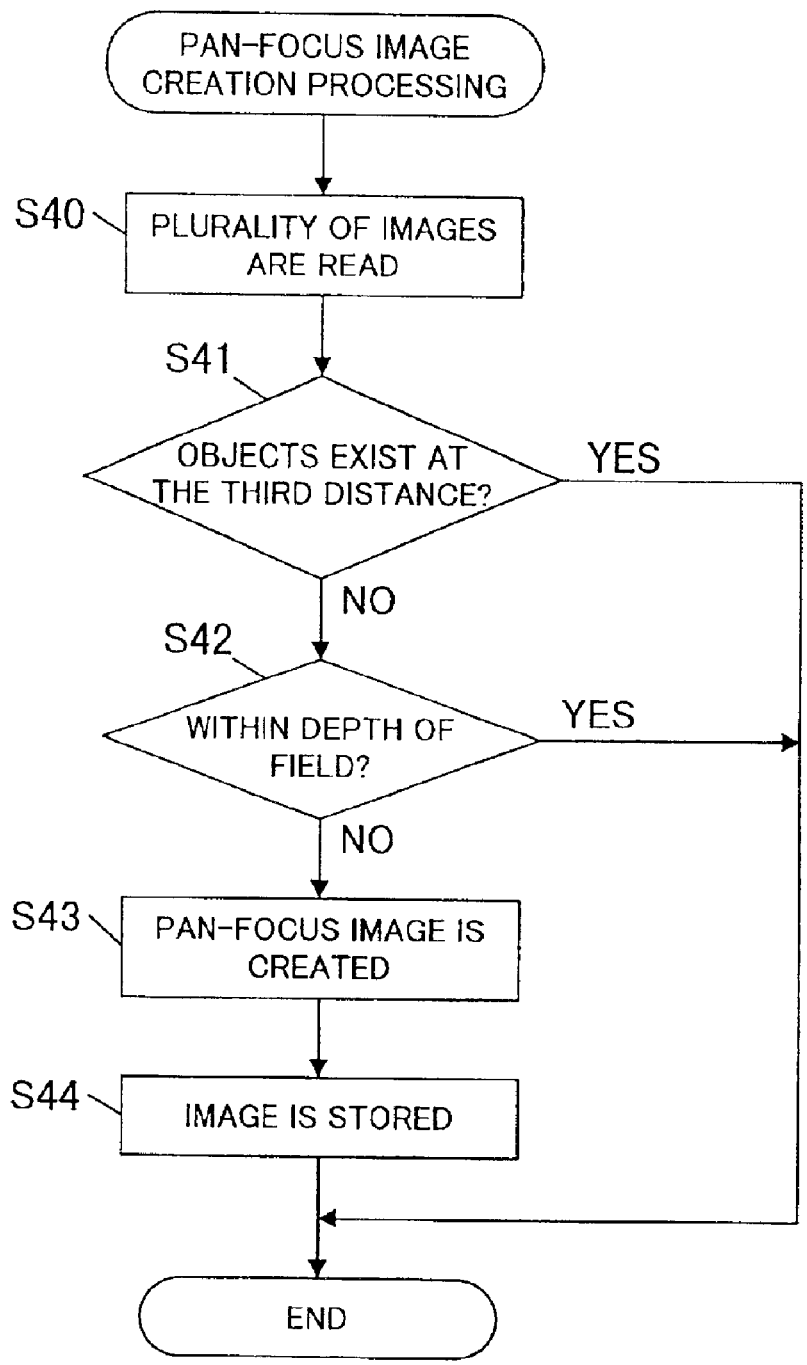
FIG. 9 is a flow chart of the program used by the computer shown in FIG. 8.

Next, the contents of the program of the software currently recorded in the aforementioned recording media 60 will be explained with reference to the flow chart of FIG. 9.

In S40, a plurality of images are read out from the hard disk 64. At the header portion of each image data, image taking conditions, such as a photographic object distance distribution, a lens focal distance and an iris-diaphragm value, are recorded.

From these image taking information, in S41, it is judged whether or not a photographic object which will be unfocused exists at the third distance other than the foreground and the background. When the photographic object exists at the third distance (YES in S41), it is considered that faults will occur in the pan-focus image creation, and therefore the routine will be terminated without performing any processing. When no photographic object exists at the third distance (NO in S41), it is judged whether or not the photographic objects exist in the depth of field in S42.

When the photographic objects exist in the depth of field (YES in S42), since there is no necessity to create a pan-focus image, the routine will be terminated without performing any processing. When no photographic object exists in the depth of field (NO in S42), a pan-focus image will be created in S43, and the created image will be stored in the hard disk 64 in S44.

In this case too, wasteful image creation processing can be avoided when it is improper to create a pan-focus image, and higher-degree image creation processing as compared to the image processing by the digital camera 1 can be attained.

(Explanation of the Third Embodiment)

Next, a digital camera to which an image taking apparatus according to a third embodiment of the present invention is applied will be explained.

This digital camera has the same constitution as the digital camera according to the first embodiment shown in FIGS. 1 and 2 except for the constitution about the image processing mode. The same reference numeral will be allotted to the same component, and the detailed explanation will be omitted.

In this digital camera 1, the digital camera 1 can record the image data taken by the CCD 3 into the recording media 6 like the usual digital camera 1, and has a blur-control function for creating a blur-controlled image. Although this blur-control functions when the blur-control mode is set by the image processing mode setting keys 102 shown in FIG. 2, the digital camera 1 may function automatically in a blur-control mode without being set by the keys 102.

The image processing mode setting keys 102 are used to set the blur-control mode or the blur degree (amount) which will be mentioned later while a user looks at the LCD monitor 103.

Figure 10:
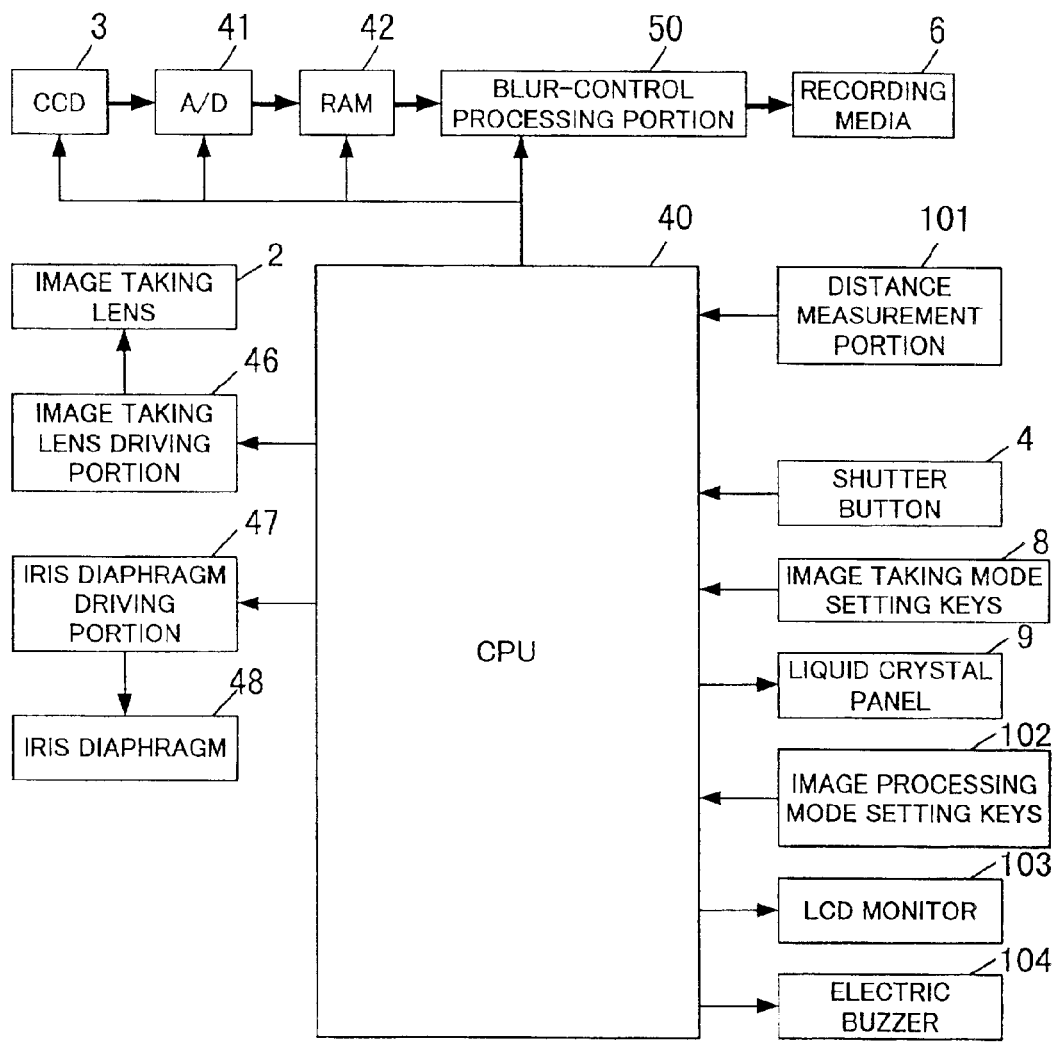
FIG. 10 is a block diagram showing the electric constitution of the digital camera according to the third embodiment of the present invention.

FIG. 10 is a block diagram showing the electric constitution of the digital camera 1. In FIG. 10, the thin arrow shows the control data flow and the thick arrow shows the image data flow.

The reference numeral 40 denotes a CPU which stores the image taking conditions at the time of the shutter button 4 being pressed, the set status of the image processing mode setting keys 102, etc., and displays the exposure conditions, etc. on the liquid crystal display panel 9. Furthermore, the CPU 40 drives the image taking lens 2 so as to focus on a suitable photographic object via the image taking lens driving portion 46 based on the distance measurement result from the distance measurement portion 101, and also controls the iris diaphragm 48 via the iris diaphragm driving portion 47. The image taking lens 2, the iris diaphragm 48 and the CCD 3 constitute an image pick-up portion 20 (shown in FIG. 11).

Furthermore, the analog image signal from the CCD 3 is converted into digital image data by the A/D converter 41, and is stored temporarily in the image memory (RAM) 42. The CPU 40 makes the recording media 6 store the image data read from the RAM 42.

In the blur-control mode, the blur-control processing portion 50 is constituted as means for composing a plurality of images different in focal distance into one image in which a blur is emphasized, and calculates the blur degree corresponding to the blur degree set by the image processing mode setting keys 102.

Figure 11:
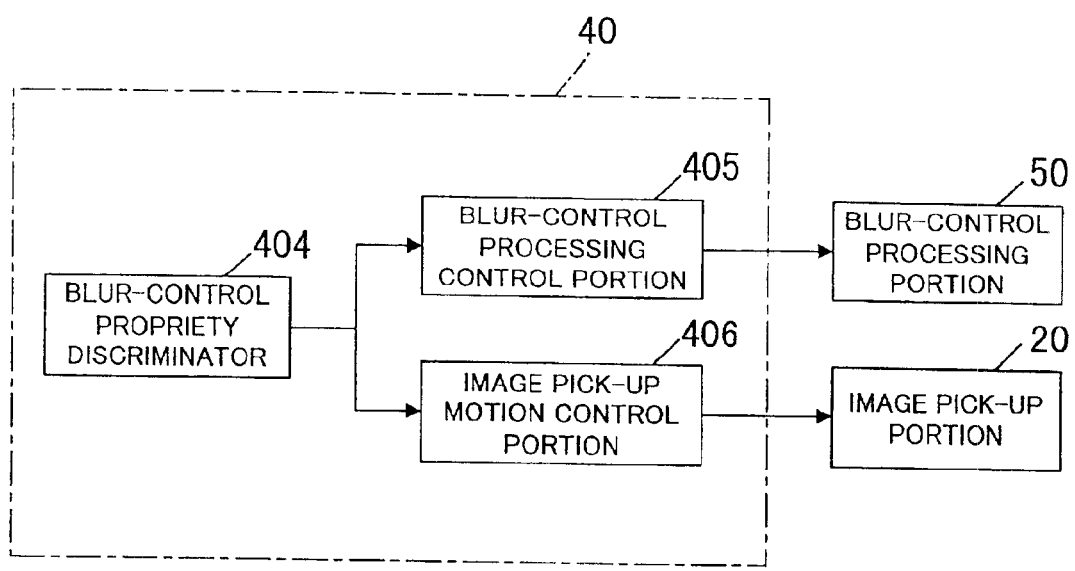
FIG. 11 is a block diagram showing the constitution of the principal part of the digital camera.

As shown in FIG. 11, the CPU 40 is functionally equipped with a blur-control propriety discriminator 404 which discriminates whether or not it is appropriate to perform blur-control processing from a plurality of images, a blur-control processing control portion 405 which controls the blur-control processing operation depending on the distinction result of the blur-control propriety discriminator 404, and an image pick-up motion control portion 406 which controls the image acquisition according to the distinction result. Only one of the blur-control processing control portion 405 and the image pick-up motion control portion 406 may be provided.

Figure 17:
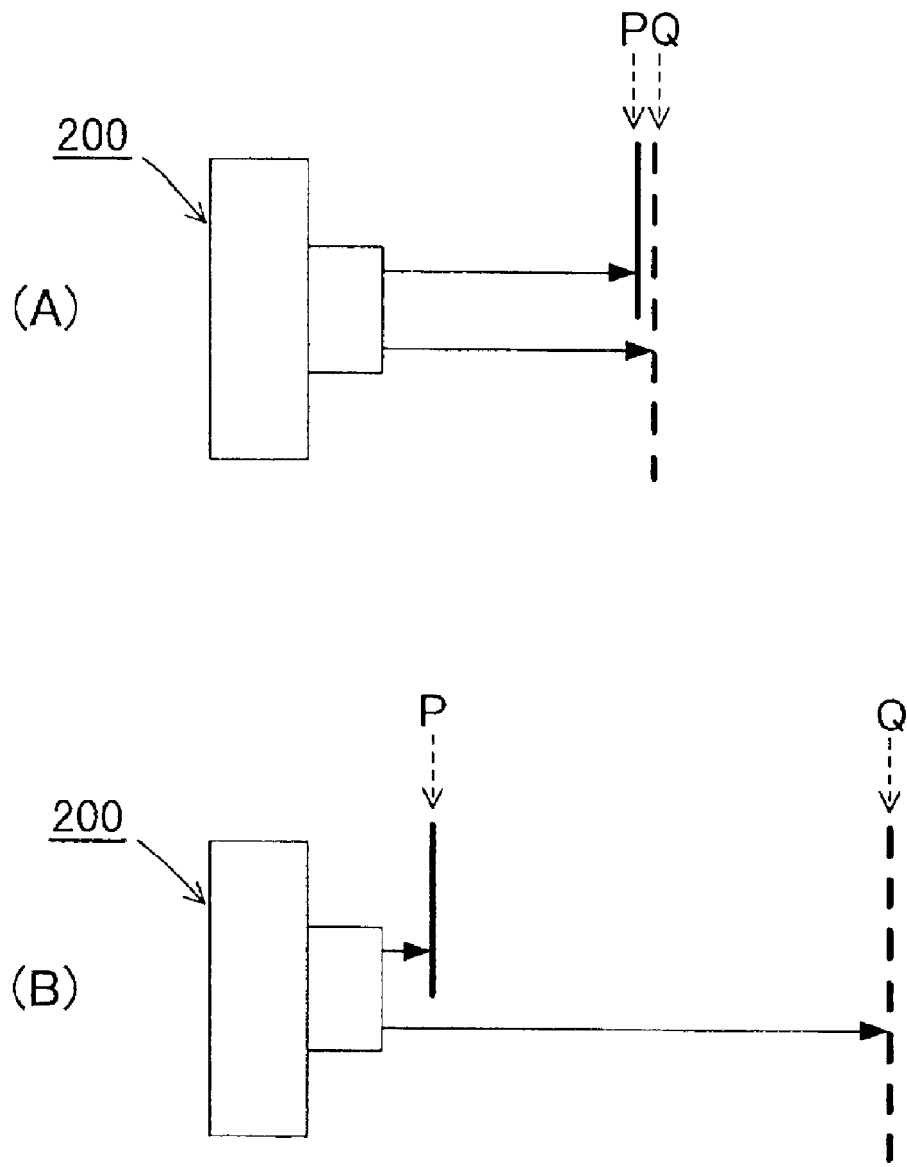
FIG. 17 is explanatory view showing a scene which is inappropriate to blur-control processing.

The blur-control propriety discriminator 404 has a function for detecting a scene which is inappropriate for blur-control processing, such as a scene in which the foreground and the background are too close to distinguish as shown in FIG. 17A and a macro image taking scene as shown in FIG. 17B. To detect the aforementioned scene, the photographic object distance information measured by the distance measurement portion 101 will be utilized. In this case, the measuring method may be a method which can measure a plurality of photographic objects, such as an active ranging method and a phase difference ranging method, etc. which are used by silver halide cameras.

Furthermore, concretely, the blur-processing control portion 405 controls the blur-control processing portion 50 so as to stop the blur-control processing when discriminated that it is inappropriate to create a blur-controlled image. If not inappropriate, it controls so as to perform the blur-control processing.

The image pick-up motion control portion 406 controls the image pick-up portion 20 such as the image pick-up lens 2 and the CCD 3 so as to stop image acquisition when discriminated that it is inappropriate to create a blur-controlled image. If not inappropriate, it controls to perform image acquisition. When the blur-control processing and the image acquisition are made to stop, the electronic warning buzzer 104 are made to sound and a warning message is displayed on the LCD monitor 103.

Next, an image composition in the blur-control mode will be explained.

Figure 12:
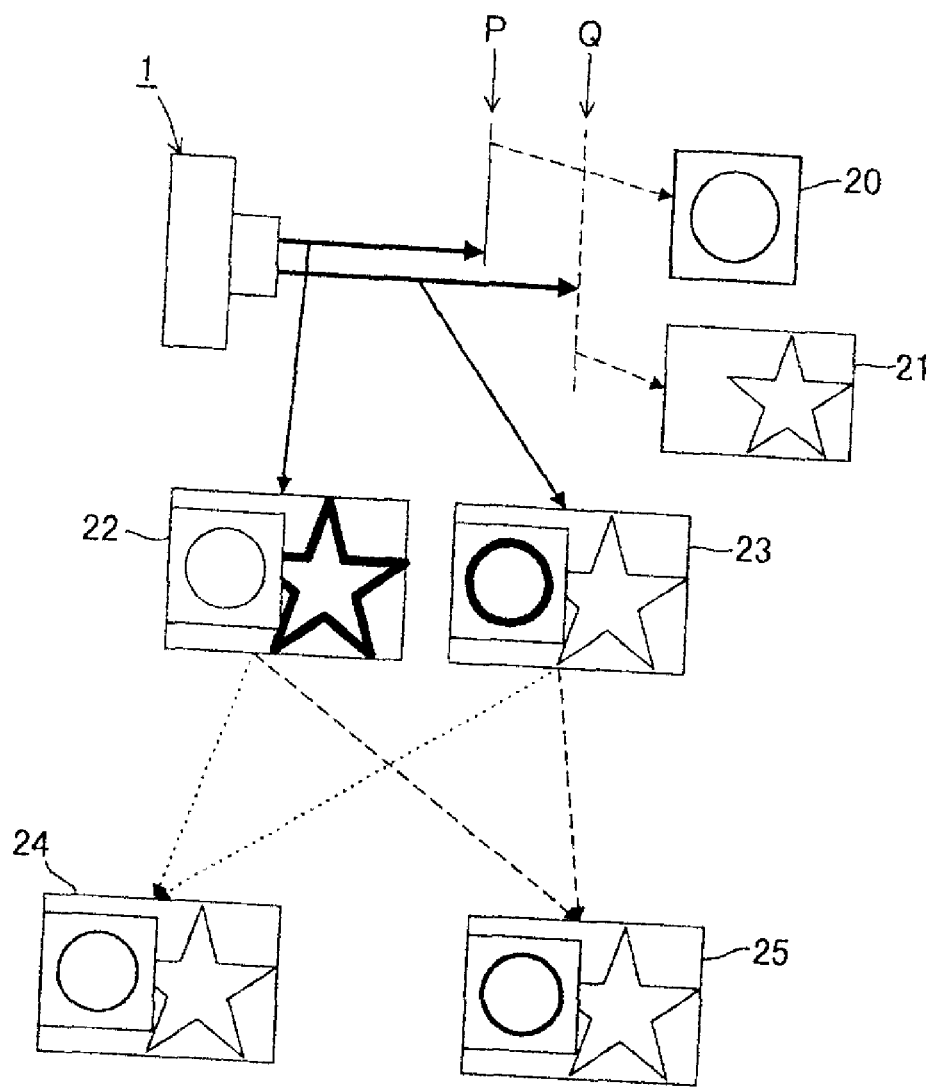
FIG. 12 is an explanatory view showing the processing for creating a blur-controlled image.

FIG. 12 shows the so-called far-and-near-conflict scene in which photographic objects 20 and 21 are located on the P plane and the Q plane, respectively. In order to simplify the explanation, each of photographic objects 20 and 21 is shown as a plane chart. The reference numeral 22 denotes an image focused on the P plane. In this image 22, the photographic object ○ of the chart 20 as a foreground is focused clearly and the photographic object ☆ of the chart 21 as a background is blurred (unfocused). On the other hand, the reference numeral 23 denotes an image focused on the Q plane. In this image 23, the photographic object ○ of the chart 20 as a foreground is blurred(unfocused) and the photographic object ☆ of the chart 21 is focused.

In this digital camera 1, the composite images 24 and 25 can be created from these two images 22 and 23. The reference numeral 24 denotes an image focused on both the photographic objects 20 and 21, i.e., the pan-focus image explained in the first embodiment. The reference numeral 25 is an image in which the blur degree of the chart 20 as a foreground is emphasized as compared to the image 23.

Thus, any blur-controlled image in which the blur degree of the foreground, the background, etc., are changed arbitrarily can be obtained from the two images of the same scene taken by changing the focus side (focal position). The blur degree can be specified by the image processing mode setting keys 102.

When the blur degree is set by operating the image processing mode settings key 102, the LCD monitor 103 displays the blur degree as follows: "Foreground focused, Background greatly blurred"; "Foreground focused, Background slightly blurred"; "Foreground greatly blurred, Background focused"; "Foreground slightly blurred, Background focused"; and "All focused(pan-focus)." The user can choose preferable one. For example, by selecting the "Foreground greatly blurred, Background focused," the image 25 will be obtained.

The control technique of this blur degree is disclosed by Japanese Patent Unexamined Laid-open Publication No. 9-200508, "Registration of multi-focus images covering rotation and first reconstruction of arbitrarily focused images by using filters" written by Kubota and Aizawa, "SHIN-GAKU GIHOU IE 99-25(1999-07)", etc., and therefore the explanation will be omitted.

Furthermore, in the aforementioned explanation, the distance distribution of photographic objects is directed to the case where there are two objects, i.e., the foreground object and the background object, and two images are composed. However, for example, three, four or more images may be composed in cases where there are a foreground object, a background object and one or more objects located therebetween.

Figure 13:
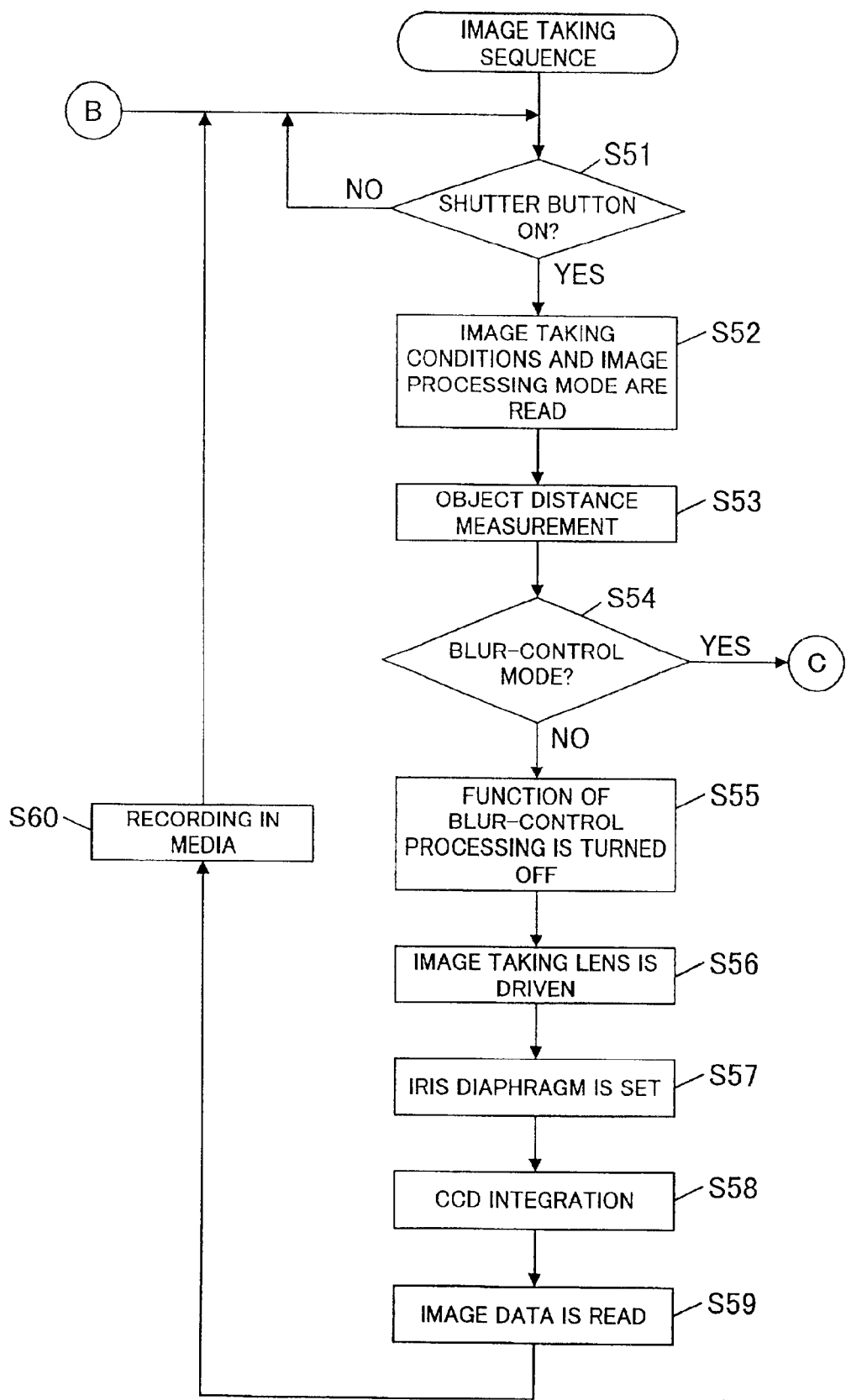
FIG. 13 is a flow chart showing the operation of the digital camera according to the third embodiment.
Figure 14:
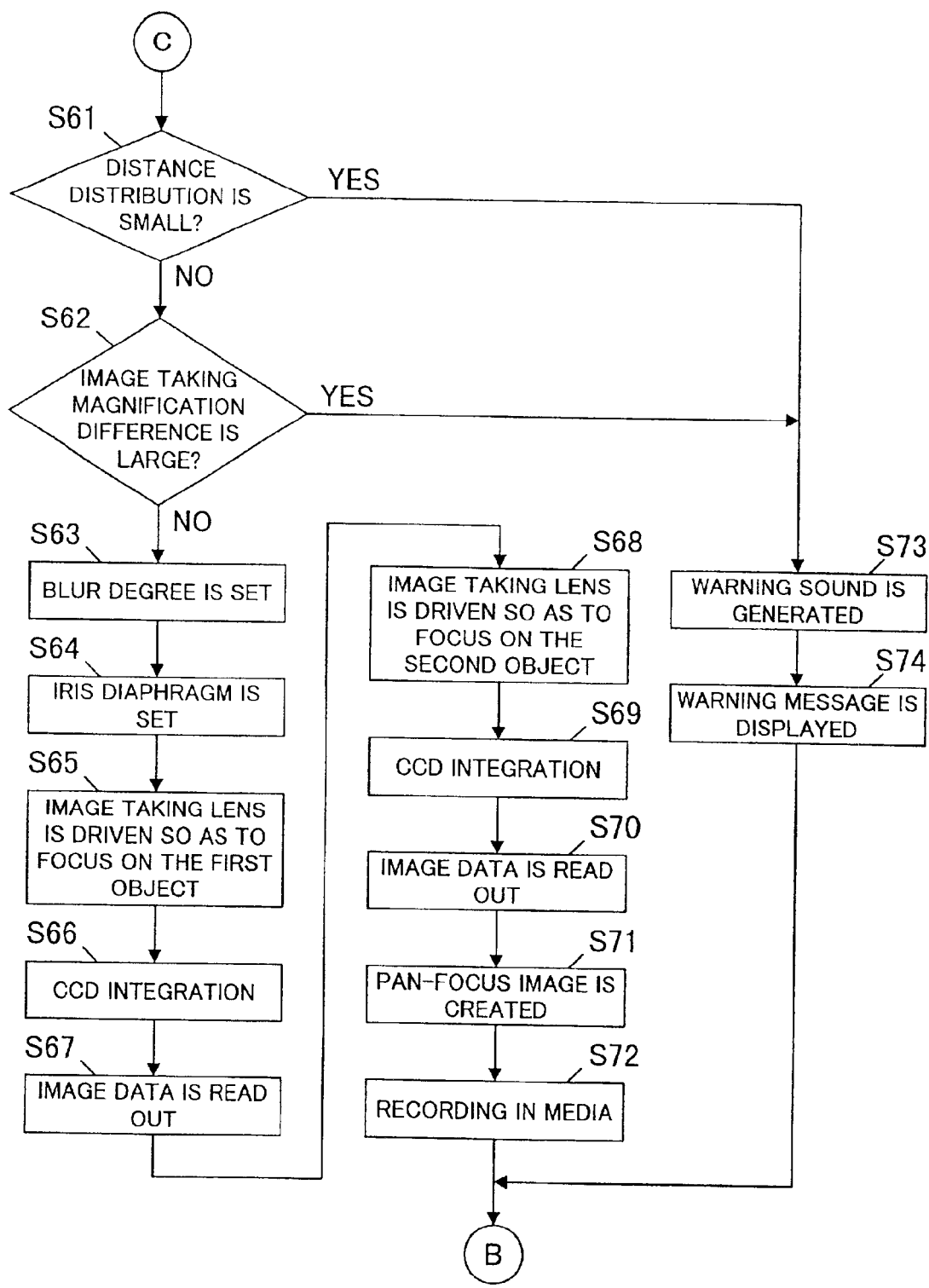
FIG. 14 is a flow chart showing the processing subsequent to the processing C in FIG. 13.

Next, the operation of the digital camera 1 according to the third embodiment will be explained with reference to the flow chart of FIGS. 13 and 14.

In addition, in the following explanation and drawings, a step will be abbreviated as "S."

In S51, when the shutter button 4 is pressed, the CPU 40 will read out and store the image taking conditions and the image processing mode at that time in S52. Then, in S53, the photographic object distance is measured by the distance measurement portion 101.

Subsequently, in S54, it is judged whether or not the blur-control mode is set in the image processing mode. If the blur-control mode is set (YES in S54), the routine proceeds to S61 in FIG. 14. If the blur-control mode is not set (NO in S54), in S55, the function of the blur-control processing portion 50 is turned off (image data passes without being processed).

Then, in S56, based on the distance measurement result, the image taking lens 2 is driven so as to focus on a suitable photographic object via the image taking lens driving portion 46. Subsequently, in S57, the iris diaphragm is set to a suitable value via the iris diaphragm driving portion 47.

Then, the CCD 3 is integrated in S58, and the image data is read out in S59. The read image data is converted into digital data by the A/D converter 41 by the pipeline architecture, and is stored temporarily in the RAM 42. In S60, the CPU 40 reads out the image data of the RAM 42, and records the image data in the media 6. Then, the routine proceeds to S51 for the next image taking.

In S54, when the blur-control mode is set (YES in S54), it is judged whether or not the distance distribution of the photographic objects is small from the distance measurement result. When the distance distribution of the photographic objects is small (YES in S61), the routine proceeds to S73. When the distance distribution of the photographic objects is not small (NO in S61), the routine proceeds to S62, and it is judged whether or not the difference of the image taking magnification between the foreground focused image and the background focused image is large from the distance measurement data. Here, it may be judged whether or not it is set to a macro image taking mode.

When the difference of the image taking magnification between the foreground focused image and the background focused image is large (YES in S62), or when the macro image taking mode is set, the routine proceeds to S73.

In S73, in the blur-control processing, since faults may occur, the CPU 40 makes the electronic warning buzzer 104 to generate warning sound, and at the same time a warning message is displayed on the LCD monitor 103 in S74. Then, in accordance with the control by the image pick-up motion control section 406, the routine returns to S51 without taking images by the CCD 3, i.e., without performing the blur-control processing.

In cases where the difference of the image taking amplification between the foreground focused image and the background focused image is not large (NO in S62), it is possible to create the blur-controlled image. Therefore, in S63, the blur degree is set to the blur-control processing portion 50. Then, in S64, the iris diaphragm 48 is set to an appropriate value via the iris diaphragm driving portion 47. Then, in S65, the image taking lens 2 is driven so as to focus on the first photographic object via the image taking lens driving portion 46. Thereafter, the CCD 3 is integrated in S66, and the image data is read out in S67. The read image data is converted into digital data by the A/D converter 41 by the pipeline architecture, and stored temporarily in the RAM 42.

Next, in S68, the image taking lens 2 is driven through the image taking lens driving portion 46 so that the second photographic object is focused. Then, the CCD 3 is integrated in S69, and the image data is read out in S70. The read image data is converted into digital data by the A/D converter 41 by the pipeline architecture, and stored temporarily in the RAM 42. Then, in S71, after the CPU 40 reads out the image data of the RAM 42 and the blur-control processing portion 50 performs the blur-control processing in S72, the processed image is recorded in the media 6, and the routine returns to S51 for the next image taking.

In the blur-control processing, as mentioned above, in cases where the distance distribution is too small, i.e., as shown in FIG. 17A, the distance between the foreground P and the background Q is too near to distinguish, it is difficult to create the blur-controlled image. Furthermore, in cases where the image taking magnification difference is large, i.e., in the macro image taking scene as shown in FIG. 17B, the boundary portion between the foreground P and the background Q becomes an undesirable image which is not separated clearly. Therefore, in cases where a situation equivalent to the two scenes as shown in FIGS. 17A and 17B is detected, even if the blur-control mode is set, the blur-control processing is not performed. This can avoid creation of poor image by wasteful blur-control processing. Furthermore, as in this embodiment, the image taking itself may be stopped in accordance with the control by the image pick-up motion control section 406 when the aforementioned situation is detected. Alternatively, after taking images, the blur-control processing may be stopped by the control of the blur-control processing control portion 405.

(Explanation of the Fourth Embodiment)

Although the digital camera as an image taking apparatus performs the blur-control processing in the third embodiment, the computer or the like as an image processing apparatus may perform the blur-control processing. In this case, the computer has the aforementioned blur-control dispensation function and the blur-control propriety distinction function.

The main constitution of the computer as an image processing apparatus are the same as that shown in FIG. 8, and this computer 61 has a drive 63 with an insertion slit 62 into which a recording media 60 is inserted. In this recording media 60, software required for the blur-control processing and the propriety distinction for creating the blur-controlled image is recorded.

Furthermore, a plurality of image data (e.g., two image data) required for the blur-control processing is obtained by a digital camera 1 and the like. The image data is introduced directly from the digital camera 1 or via a portable recording medium (not shown), and stored in the storage of the computer 61, for example, the hard disk 64.

Figure 15:
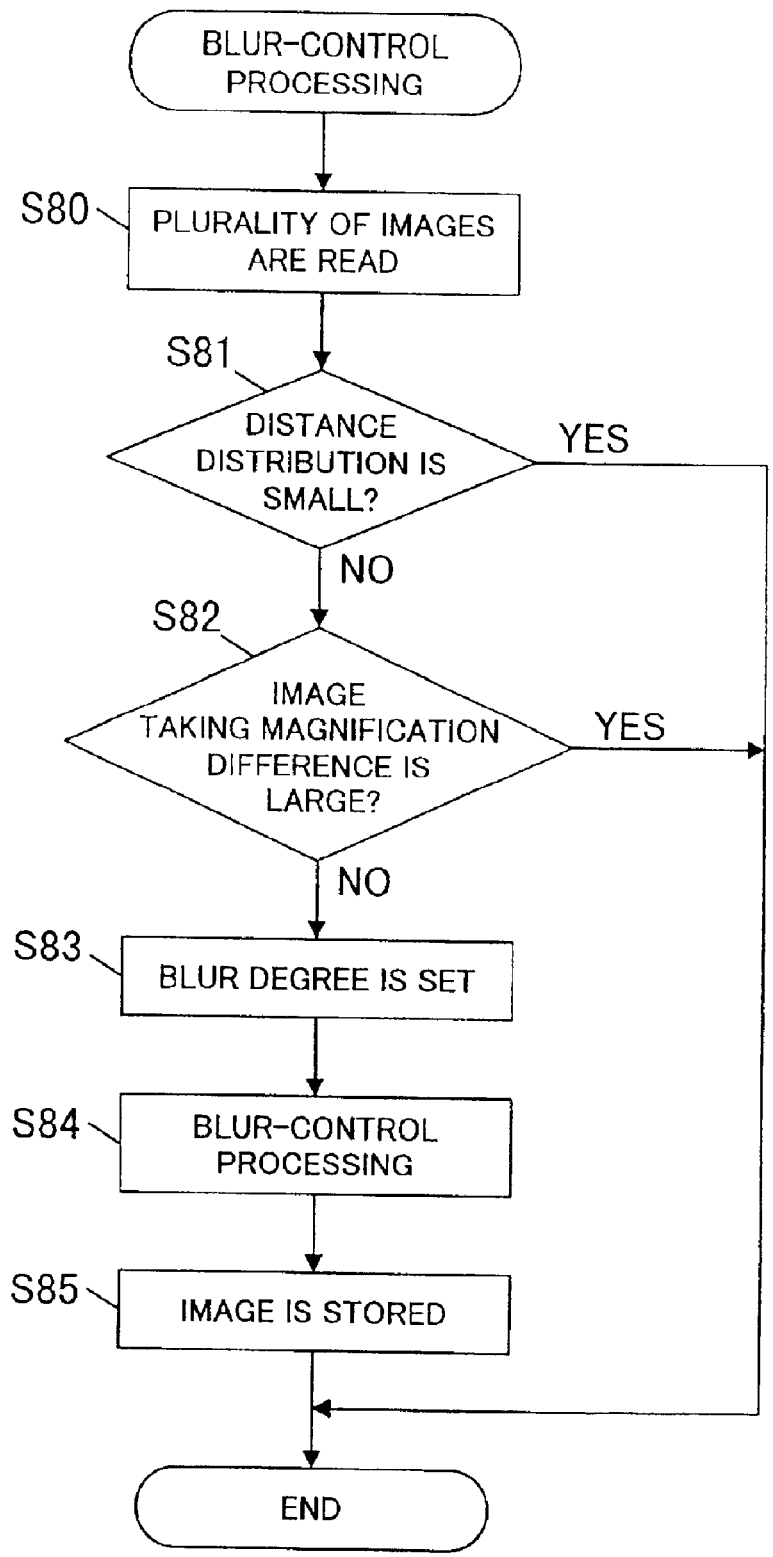
FIG. 15 is a flow chart showing the program for performing the blur-control processing by the computer as an image processing apparatus according to the fourth embodiment.

Next, the contents of the program of the software currently recorded in the aforementioned recording media 60 will be explained with reference to the flow chart of FIG. 15.

In S80, a plurality of images are read out from the hard disk 64. At the header portion of each image data, image taking conditions, such as a photographic object distance distribution, a lens focal distance and an iris-diaphragm value, are recorded.

From these image taking information, in S81, it is judged whether or not the photographic object distance distribution is small. When the photographic object distance distribution is small (YES in S81), it is considered that faults will occur in the blur-control processing, and the routine is terminated without performing any processing. When the photographic object distance distribution is not small (NO in S81), it is judged whether or not the difference between the image taking magnification of the foreground focused image and that of the background focused image is large. Here, alternatively, it may be judged whether or not a macro image taking mode is set.

When the difference of the image taking magnification is large (YES in S82), the routine terminates without performing any processing, considering that faults will occur in the blur-control processing. On the contrary, when the difference is not so large (NO in S82), the blur-control processing is possible, and an appropriate blur degree is set in S83. Then, in S84, the blur-control processing is performed, and, in S85, the processed image is stored in the hard disk 64.

In this case too, wasteful image creation processing can be avoided. Furthermore, a higher-degree image creation processing as compared to the image processing by the digital camera 1 can be attained.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims.

What is claimed is:

1. An image taking apparatus, comprising:
    an image sensor which takes a plurality of images different in focal distance;
    a processor which creates a pan-focus image focused on each of different photographic objects from said plurality of images taken by said image sensor;
    a discriminator which discriminates whether or not it is appropriate to create said pan-focus image; and
    a controller which forbids said image sensor to take images when said discriminator discriminates that it is not appropriate to create said pan-focus image.

2. The image taking apparatus as recited in claim 1, wherein said discriminator discriminates that it is not appropriate to create said pan-focus image when photographic object which is out of focus exists or when all photographic objects exist in a depth of field.

3. An image taking apparatus, comprising:
    an image sensor which takes a plurality of images different in focal distance;
    a processor which creates a blur-controlled image of a photographic object from said plurality of images taken by said image sensor;
    a discriminator which discriminates whether or not it is appropriate to create said blur-controlled image; and
    a controller which forbids said image sensor to take images when it is discriminated by said discriminator that it is not appropriate to create said blur-controlled image.

4. The image taking apparatus as recited in claim 3, wherein said discriminator discriminates that it is not appropriate to create said blur-controlled image when a distance distribution of photographic objects of said plurality of images is small or when a difference in photography magnification of said plurality of images is large.

5. The image taking apparatus as recited in claim 1, wherein said controller provides a warning when said discriminator discriminates that it is not appropriate to create said pan-focus image.

6. The image taking apparatus as recited in claim 3, wherein said controller causes a warning to be provided when said discriminator discriminates that it is not appropriate to create said blur-controlled image.

* * * * *

UNITED STATES PATENT AND TRADEMARK OFFICE
CERTIFICATE OF CORRECTION

PATENT NO. : 6,940,555 B2
DATED : September 6, 2005
INVENTOR(S) : Noriyuki Okisu et al.

It is certified that error appears in the above-identified patent and that said Letters Patent is hereby corrected as shown below:

<u>Title page,</u>
Item [75], Inventors:, delete ""Noriyuki Okisu, Osaka (JP); Yuji Taguchi, Osaka (JP); Yasuhiro Morimoto, Osaka (JP)" and insert -- Noriyuki Okisu, Osakasayama (JP); Yuji Taguchi, Itami (JP); Yasuhiro Morimoto, Takatsuki (JP) --.

Signed and Sealed this

Fifteenth Day of November, 2005

JON W. DUDAS
*Director of the United States Patent and Trademark Office*